United States Patent
Nigam et al.

(10) Patent No.: US 11,726,482 B2
(45) Date of Patent: Aug. 15, 2023

(54) SYSTEMS AND METHODS FOR MULTI-FACTOR PATHFINDING

(71) Applicant: RAYTHEON COMPANY, Waltham, MA (US)

(72) Inventors: Rupal Nigam, Ann Arbor, MI (US); James Mullen, Dulles, VA (US)

(73) Assignee: RAYTHEON COMPANY, Waltham, MA (US)

(*) Notice: Subject to any disclaimer, the term of this patent is extended or adjusted under 35 U.S.C. 154(b) by 509 days.

(21) Appl. No.: 16/745,885

(22) Filed: Jan. 17, 2020

(65) Prior Publication Data
US 2021/0223777 A1   Jul. 22, 2021

(51) Int. Cl.
G05D 1/02     (2020.01)
G01C 21/36    (2006.01)
G06F 16/29    (2019.01)

(52) U.S. Cl.
CPC ....... *G05D 1/0212* (2013.01); *G01C 21/3676* (2013.01); *G05D 1/0274* (2013.01); *G06F 16/29* (2019.01)

(58) Field of Classification Search
None
See application file for complete search history.

(56) References Cited

U.S. PATENT DOCUMENTS

| | | | |
|---|---|---|---|
| 2009/0157233 A1* | 6/2009 | Kokkeby | G01S 3/7864 701/3 |
| 2011/0002194 A1* | 1/2011 | Imhof | G01V 1/32 367/53 |
| 2018/0188415 A1* | 7/2018 | Imhof | G01V 99/005 |
| 2018/0281191 A1* | 10/2018 | Sinyavskiy | G05D 1/0274 |

OTHER PUBLICATIONS

Murphy et al., "Risky Planning on Probabalisitic Costmaps for Path Planning in Outdoor Environments: A framework for path planning over costmaps that are constructed using probabilistic heuristics," IEEE Transactions on Robotics (2013) vol. 29, Issue: 2, pp. 445-457 (Year: 2013).*

"Risky Planning on Probabilistic Costmaps for Path Planning in Outdoor Environments: A framework for path planning over costmaps that are constructed using probabilistic heuristics," IEEE Transactions on Robotics (2013) vol. 29, Issue: 2, pp. 445-457. (Year: 2013).*

International Search Report and Written Opinion in International Patent Application No. PCT/US2021/013611 dated May 21, 2021.

(Continued)

*Primary Examiner* — Aniss Chad
*Assistant Examiner* — Mahmoud M Kazimi
(74) *Attorney, Agent, or Firm* — Lando & Anastasi, LLP

(57) ABSTRACT

Techniques for multi-factor pathfinding are disclosed. A system receives multiple data sets that represent multiple physical properties associated with multiple three-dimensional coordinates of a physical environment. The system generates multiple weighted data layers corresponding to the physical properties, at least by applying weights to the data sets. The system generates a multi-factor costmap for the three-dimensional environment, based at least on the weighted data layers. The system determines a path through the three-dimensional environment, based at least on the multi-factor costmap.

17 Claims, 9 Drawing Sheets

(56) References Cited

OTHER PUBLICATIONS

Murphy et al. "Risky Planning on Probabilistic Costmaps for Path Planning in Outdoor Environments: A framework for path planning over costmaps that are constructed using probabilistic heuristics," IEEE Transactions on Robotics (2013) vol. 29 ,Issue: 2, pp. 445-457.

Liu, M. "Robotic Online Path Planning on Point Cloud: Solves the navigation problem for robots using raw point cloud data as input in 2.5-D environments," IEEE Transactions on Cybernetics (2016) vol. 46, Issue 5, pp. 1217-1228.

Jaillet et al. "Sampling-Based Path Planning on Configuration-Space Costmaps : Uses the rapidly exploring random tree (RRT) algorithm for path planning," IEEE Transactions on Robotics (2010) vol. 26, Issue 4, pp. 635-646.

\* cited by examiner

Path Data 602

X-Coordinates 604:
```
[[ 10  11  12  13  14  15  16  17  18  19  20  21  22  23  24  25  26  27
   28  29  30  31  32  33  34  34  34  34  34  34  34  34  34  34  34  34
   34  34  34  34  34  34  34  34  34  34  34  34  34  34  34  34  34  34
   34  34  34  34  34  34  34  34  34  34  34  34  34  34  34  34  34  34
   34  34  34  34  34  35  35  36  37  38  39  40  41  42  43  44  45  46
   46  46  46  47  48  49  50  51  52  53  54  55  56  57  58  59  60  61
   62  63  64  65  66  67  68  69  70  71  72  73  74  75  76  77  78  79
   80  81  82  83  84  85  86  87  88  89  90  91  92  93  94  95  96  97
   98  99 100 101 102 103 104 105 106 107 108 109 110 111 112 113 114 115
  116 117 118 119 120 121 122 123 124 125 126 127 128 129 130 131 132 133
  134 135 136 137 138 139 140 141 142 143 144 144 144 145 146 147 148 149
  150 151 152 153 154 155 156 157 158 159 160 161 162 162 162 162 162 162
  162 162 162 162 162 162 162 162 162 162 162 162 162 163 164 165 166 167
  168 169 170 170 170 170 170]
```

Y-Coordinates 606:
```
 [ 10  11  12  13  14  15  16  17  18  19  20  21  22  23  24  25  26  27
   28  29  30  31  32  33  34  35  36  37  38  39  40  41  42  43  44  45
   46  47  48  49  50  51  52  53  54  55  56  57  58  59  60  61  62  63
   64  65  66  67  68  69  70  71  72  73  74  75  76  77  78  79  80  81
   82  83  84  85  86  87  88  89  90  91  92  93  94  95  96  97  98  99
  100 101 102 103 104 105 106 107 108 109 110 111 112 113 114 115 116 117
  118 119 120 121 122 123 124 125 126 127 128 129 130 131 132 133 134 135
  136 137 138 139 140 141 142 143 144 145 146 147 148 149 150 151 152 153
  154 155 156 157 158 159 160 161 162 163 164 165 166 167 168 169 170 171
  172 173 174 175 176 177 178 179 180 181 182 183 184 185 186 187 188 189
  190 191 192 193 194 195 196 197 198 199 200 201 202 203 204 205 206 207
  208 209 210 211 212 213 214 215 216 217 218 219 220 221 222 223 224 225
  226 227 228 229 230 231 232 233 234 235 236 237 238 239 240 241 242 243
  244 245 246 247 248 249 250]]
```

Path Cost 608: 70342.15360761038

FIG. 6

SYSTEMS AND METHODS FOR MULTI-FACTOR PATHFINDING

BACKGROUND

In general, preoperational planning (e.g., for troops, autonomous and/or remote-controlled vehicles, etc.) involves determining a path with the least amount of obstructions and/or vulnerabilities. For example, in an urban environment, features such as buildings, geographical terrain, hostile forces, and radio frequency ("RF") interference or jamming geolocation denial, etc., may present obstructions and/or vulnerabilities. Failure to avoid obstructions and vulnerabilities may result in mission failure, damage or loss of equipment, and/or injury or loss of life.

Approaches described in this section have not necessarily been conceived and/or pursued prior to the filing of this application. Accordingly, unless otherwise indicated, approaches described in this section should not be construed as prior art.

SUMMARY

One or more embodiments allow for multi-factor pathfinding, based on multiple properties (e.g., physical properties and/or other characteristics) of a physical environment. Each physical property may be represented as a layer in a multi-layer costmap. A costmap is a data structure that quantifies, as a "cost," the difficulty of traversing the physical environment. Specifically, a costmap may include numerical values corresponding to the respective costs associated with three-dimensional coordinates in the physical space. For example, higher values may correspond to higher costs. The total cost of a path through the physical environment may be based on the costs associated with the coordinates along the path. For example, the total cost of a path may be the sum, product, or another function of the costs associated with coordinates along the path. As used herein, the term "lowest-cost path" refers to an optimal route (e.g., the path of least resistance) through the physical environment, given the known properties of the environment. As described herein, the lowest-cost path may also be based on one or more user-specified criteria or preferences.

Using a multi-layer costmap may allow for the lowest-cost path to be recalculated based on new data for one or more of the physical properties. In addition, one or more embodiments are not limited to a particular set of physical properties and support the introduction of any number of additional costmap layers. Some embodiments allow users to assign weights to costmap layers, to prioritize and/or deprioritize one or more particular physical properties of the physical environment. The multi-layer costmap may be based on data from one or more three-dimensional point clouds and/or other types of data. One or more of the costmap layers may be based on RF propagation data. Including a costmap layer based on RF propagation data may help determine a path that maintains contact with a transmitter, avoids a jammer, and/or otherwise accounts for RF propagation data.

In general, in one aspect, one or more non-transitory machine-readable media store instructions which, when executed by one or more processors, cause: receiving multiple data sets that collectively represent multiple physical properties associated with three-dimensional coordinates of a physical environment; generating weighted data layers corresponding to the physical properties, at least by applying weights to the data sets; generating a multi-factor costmap for the three-dimensional environment, based at least on the weighted data layers; and determining a path through the three-dimensional environment, based at least on the multi-factor costmap. The one or more media may further store instructions which, when executed by one or more processors, cause receiving user input that designates weights for at least two of the data sets. The one or more media may further store instructions which, when executed by one or more processors, cause: subsequent to determining the path through the three-dimensional environment, receiving an updated data set that represents one of the physical properties; generating an updated multi-factor costmap, based at least on the updated data set; and determining an updated path through the three-dimensional environment, based at least on the updated multi-factor costmap. Each data set may include, respectively, a mapping of the three-dimensional coordinates to numerical representations of one of the physical properties. Applying the weights to the data sets may include, for each data set, multiplying the numerical representations of the physical property by a corresponding weight. Generating the multi-factor costmap may include, for each of the three-dimensional coordinates, computing a sum of the corresponding weighted numerical representations across the weighted data layers. The data sets may include a first data set indicating classifications of physical materials in the physical environment, a second data set indicating radio frequency propagation from a first source defined as a home base, and a third data set indicating radio frequency propagation from a second source defined as a jammer. The data sets may further include a fourth data set indicating at least one location of at least one hostile force, and a fifth data set indicating at least one location of at least one friendly force.

In general, in one aspect, a system includes at least one device including a hardware processor, the system being configured to perform operations including: receiving multiple data sets that collectively represent multiple physical properties associated with three-dimensional coordinates of a physical environment; generating weighted data layers corresponding to the physical properties, at least by applying weights to the data sets; generating a multi-factor costmap for the three-dimensional environment, based at least on the weighted data layers; and determining a path through the three-dimensional environment, based at least on the multi-factor costmap. The operations may further include receiving user input that designates weights for at least two of the data sets. The operations may further include: subsequent to determining the path through the three-dimensional environment, receiving an updated data set that represents one of the physical properties; generating an updated multi-factor costmap, based at least on the updated data set; and determining an updated path through the three-dimensional environment, based at least on the updated multi-factor costmap. Each data set may include, respectively, a mapping of the three-dimensional coordinates to numerical representations of one of the physical properties. Applying the weights to the data sets may include, for each data set, multiplying the numerical representations of the physical property by a corresponding weight. Generating the multi-factor costmap may include, for each of the three-dimensional coordinates, computing a sum of the corresponding weighted numerical representations across the weighted data layers. The data sets may include a first data set indicating classifications of physical materials in the physical environment, a second data set indicating radio frequency propagation from a first source defined as a home base, and a third data set indicating radio frequency propagation from a second source defined as a jammer. The data sets may further include a fourth data set indicating at least one location of at least one hostile force, and a fifth data set indicating at least one location of at least one friendly force.

In general, in one aspect, a method includes: receiving multiple data sets that collectively represent multiple physical properties associated with three-dimensional coordinates of a physical environment; generating weighted data layers corresponding to the physical properties, at least by applying weights to the data sets; generating a multi-factor costmap for the three-dimensional environment, based at least on the weighted data layers; and determining a path through the three-dimensional environment, based at least on the multi-factor costmap. The method may further include receiving user input that designates weights for at least two of the data sets. The method may further include: subsequent to determining the path through the three-dimensional environment, receiving an updated data set that represents one of the physical properties; generating an updated multi-factor costmap, based at least on the updated data set; and determining an updated path through the three-dimensional environment, based at least on the updated multi-factor costmap. Each data set may include, respectively, a mapping of the three-dimensional coordinates to numerical representations of one of the physical properties. Applying the weights to the data sets may include, for each data set, multiplying the numerical representations of the physical property by a corresponding weight. Generating the multi-factor costmap may include, for each of the three-dimensional coordinates, computing a sum of the corresponding weighted numerical representations across the weighted data layers. The data sets may include a first data set indicating classifications of physical materials in the physical environment, a second data set indicating radio frequency propagation from a first source defined as a home base, and a third data set indicating radio frequency propagation from a second source defined as a jammer. The data sets may further include a fourth data set indicating at least one location of at least one hostile force, and a fifth data set indicating at least one location of at least one friendly force.

One or more embodiments described in this Specification and/or recited in the claims may not be included in this General Overview section.

BRIEF DESCRIPTION OF THE DRAWINGS

Various aspects of at least one embodiment are discussed below with reference to the accompanying Figures, which are not intended to be drawn to scale. The Figures are included to provide illustration and a further understanding of the various aspects and embodiments, and are incorporated in and constitute a part of this specification, but are not intended to define the limits of the disclosure. In the Figures, each identical or nearly identical component that is illustrated in various Figures is represented by a like numeral. For the purposes of clarity, some components may not be labeled in every figure. In the Figures:

FIG. 6 illustrates an example of path data according to an embodiment;

DETAILED DESCRIPTION

The following table of contents is provided for the reader's convenience and is not intended to define the limits of the disclosure.

1. SYSTEM ARCHITECTURE
2. OPERATIONS FOR MULTI-FACTOR PATHFINDING
3. ADDITIONAL EXAMPLES
4. MISCELLANEOUS; EXTENSIONS
5. COMPUTING DEVICES
6. COMPUTER NETWORKS

1. System Architecture

Figure 1:
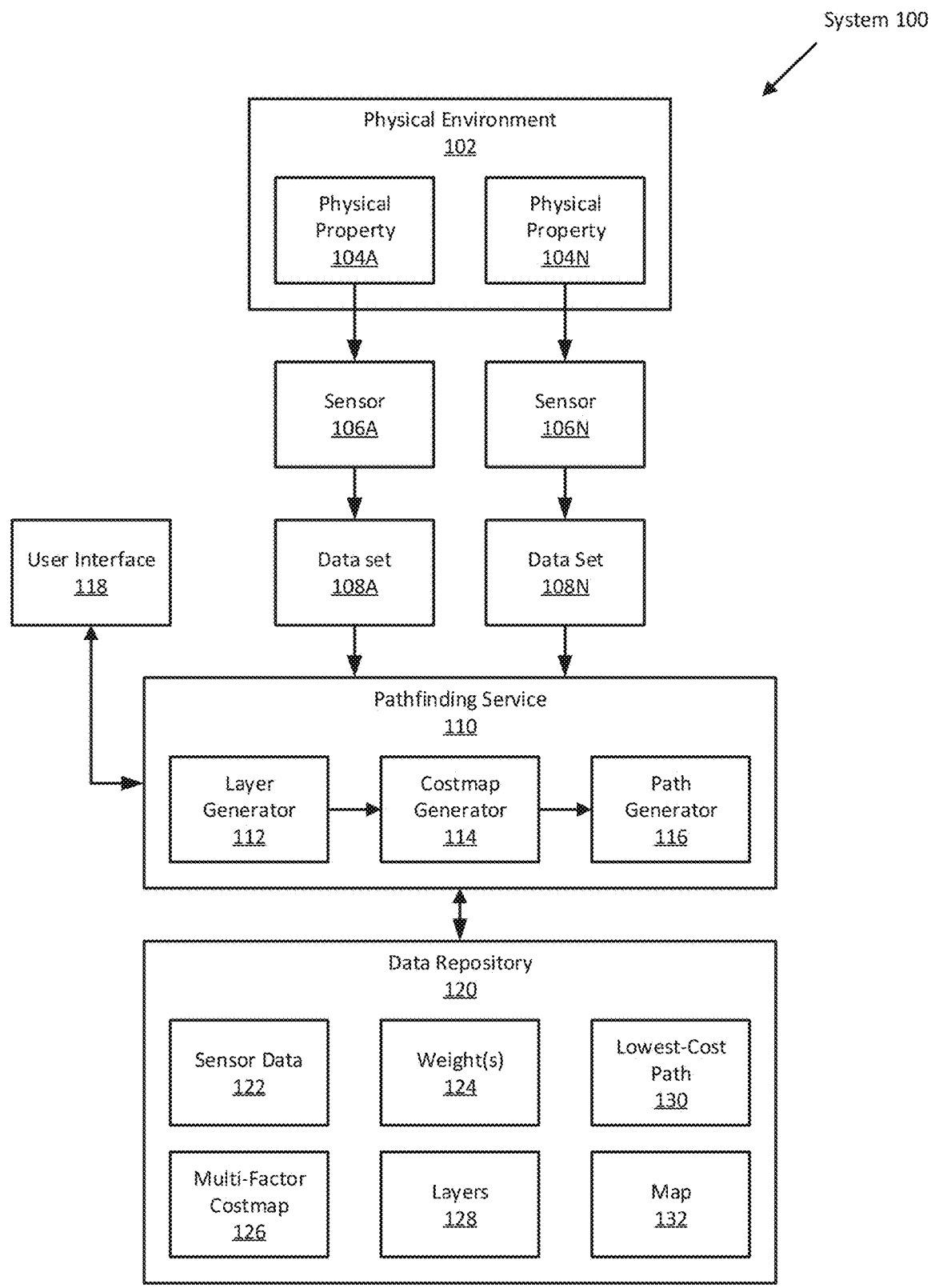
FIG. 1 is a block diagram of an example of a system according to an embodiment.

FIG. 1 is a block diagram of an example of a system 100 according to an embodiment. In an embodiment, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

One or more embodiments allow for multi-factor pathfinding in a physical environment 102. The physical environment 102 may be an urban environment (e.g., a city or town) or another kind of environment (e.g., a jungle, ocean, desert, or other kind of environment). In general, the physical environment 102 is a three-dimensional space through which a path is sought that avoids obstructions and/or vulnerabilities. Locations in the physical environment 102 may be represented as three-dimensional coordinates. For example, three-dimensional coordinates may be represented as X, Y, and Z-values with respect to a particular reference point. Alternatively, another kind of three-dimensional coordinate system may be used.

In an embodiment, sensors (e.g., sensors 106A, 106N) are configured to obtain data that describes physical properties (e.g., physical properties 104A, 104N) of the physical environment 102. Specifically, the sensors are configured to obtain data that describes physical properties associated with three-dimensional coordinates in the physical environment 102. For a given three-dimensional coordinate, for example, physical properties may include a type of material at that location (e.g., building, tree, bare earth, water, etc.), elevation. Alternatively or additionally, physical properties may indicate the location(s) of one or more friendly forces. Alternatively or additionally, physical properties may include RF propagation data. Some RF propagation data may be considered "friendly" RF propagation data, for example, where the source is defined as a home base. Some RF propagation data may be considered "hostile" RF propagation data, for example, where the source is defined as an RF jammer. Obtaining RF propagation data may use techniques described in commonly owned U.S. Provisional Patent Application No. 62/883,331, filed Aug. 6, 2019 and titled "Process for Generation of RF Propagation Point Cloud from Imagery," incorporated herein by reference in its entirety. Prior pathfinding systems, such as FoxTEN and ATAK, do not account for RF propagation data. Alternatively or additionally, physical properties may indicate the location(s) of one more hostile forces, such as a sniper. In a setting where climate and/or weather-related factors may vary along a path (e.g., a geographically large setting), physical properties may indicate temperatures, humidity, wind speed, and/or another kind of climate-related physical property or combination thereof. Alternatively or additionally, other physical properties such as elevation, tree density, etc. may be used. One or more embodiments may account for many different kinds of physical properties and/or combinations thereof, and should not be considered limited to the specific examples described herein. Each sensor may generate a corresponding data set (e.g., data sets 108A, 108N).

In an embodiment, each data set includes data that describes one or more physical properties associated with three-dimensional coordinates in the physical environment 102. Specifically, each data set may map numerical values that represent physical properties to corresponding three-dimensional coordinates. For example, one or more data sets may indicates classifications of physical materials at particular three-dimensional coordinates in the physical environment, radio frequency propagation from a source defined as a home base, radio frequency propagation from a source defined as a jammer, one or more locations of hostile forces, one or more locations of friendly forces, and/or one or more other properties or combinations thereof. The data sets may take many different forms. For example, one or more of the data sets may include a three-dimensional point cloud. Prior pathfinding systems, such as FoxTEN and ATAK, do not support pathfinding based on information from a three-dimensional point cloud. Alternatively or additionally, one or more of the data sets may include a database table, spreadsheet, extensible markup language (XML) file, JavaScript Object Notation (JSON) structure, and/or another type of data or combination thereof.

In an embodiment, a pathfinding service 110 refers to hardware and/or software configured to perform multi-factor pathfinding, based on sensor data 122 (e.g., one or more point clouds and/or other type(s) of data) obtained from the sensors (e.g., as data sets 108A, 108N). Examples of operations for multi-factor pathfinding are described below with respect to FIG. 2.

In an embodiment, the pathfinding service 110 includes a layer generator 112. The layer generator 112 is configured to generate multiple layers 128 of a multi-factor costmap 126, based on the sensor data 122. As noted above, a costmap is a data structure that quantifies, as a "cost," the difficulty of traversing the physical environment 102. For example, a costmap may include numerical values corresponding to the respective costs associated with three-dimensional coordinates in the physical environment 102. The total cost of a path through the physical environment 102 may be based on the costs associated with the coordinates along the path. For example, the total cost of a path may be the sum, product, or another function of the costs associated with coordinates along the path. Each of the layers 128, respectively, may include a set of numerical values that describes one or more physical attributes of the physical environment 102. For example, each of the layers 128 may include a three-dimensional array or other data structure that stores numerical representations of one or more physical properties for one or more three-dimensional coordinates in the physical environment 102. Each of the layers may be a costmap. That is, the numerical representations of the one or more physical properties may correspond to costs associated with the one or more physical properties represented by that layer.

In an embodiment, the pathfinding service 110 is configured to apply one or more weights 124 to one or more of the layers 128. A weight 124 is a numerical value that indicates a relative importance of the physical property represented by a particular layer. For example, a weight 124 may be a multiplication factor, where a weight 124 less than one indicates reduced importance, a weight of one indicates neutral importance, and a weight 124 greater than one indicates increased importance. The pathfinding service 110 may be configured to receive user input (e.g., via a user interface 118) that assigns, directly or indirectly, one or more weights 124 to one or more of the layers 128. Assigning one or more weights 124 helps establish priorities for pathfinding. Assigning a high weight to a particular layer may indicate that pathfinding should prioritize (i.e., assign a high cost to) the corresponding physical property, while assigning a low weight to a particular layer may indicate that pathfinding should deprioritize (i.e., assign a low cost to) the corresponding physical property. For example, in a covert operation, a layer 128 that includes data associated with locations of hostile forces may be assigned a very high weight (to discourage paths passing near hostile forces) and a layer 128 that includes data associated with building structures may be assigned a very low weight (to encourage paths that provide cover from building structures).

In an embodiment, the pathfinding service 110 includes a costmap generator 114. The costmap generator 114 is configured to generate a multi-factor costmap 126, based on the layers 128. The multi-factor costmap 126 may be a data structure that combines data from the layers 128, such that a single cost value is associated with each three-dimensional coordinate in the physical environment 102. For example, for each three-dimensional coordinate, the costmap generator 114 may add, multiply, or otherwise combine the values across the layers 128 for that three-dimensional coordinate. If a weight 124 is assigned to a particular layer 128, the weight 124 may be applied before generating the multi-factor costmap 126.

In an embodiment, the pathfinding service 110 includes a path generator 116. The path generator 116 is configured to determine a lowest-cost path 130 (as a best effort, based on the available data, which may be inaccurate and/or change over time) through the physical environment 102, based on the multi-factor costmap 126. For example, the path generator 116 may use the A* search algorithm to determine the lowest-cost path 130. Alternatively, the path generator 116 may use Floyd-Warshall, Johnson's algorithm, and/or another algorithm or combination thereof. The path generator 116 may use multiple algorithms and determine the lowest-cost path 130 based on the multiple results, for example by determining an average or highest-confidence path. The lowest-cost path 130 may include three-dimensional coordinates or two-dimensional coordinates. In many cases, two-dimensional coordinates are sufficient to indicate direction of movement across physical terrain, with the understanding that altitude may vary along the way.

In an embodiment, the pathfinding service 110 is configured to generate a map 132 that includes a visual representation of the lowest-cost path 130. For example, the pathfinding service 110 may obtain an existing two-dimensional or three-dimensional visual representation of the physical environment 102 and mark the coordinates of the lowest-cost path 130 (e.g., using one or more particular colors) on the existing visual representation. The pathfinding service 110 may be configured to present the map 132 in a user interface 118.

In an embodiment, a data repository 120 is any type of storage unit and/or device (e.g., a file system, database, collection of tables, or any other storage mechanism) for storing data. A data repository 120 may include multiple different storage units and/or devices. The multiple different storage units and/or devices may or may not be of the same type or located at the same physical site. Further, a data repository 120 may be implemented or may execute on the same computing system as one or more other components of the system 100. Alternatively or additionally, a data repository 120 may be implemented or executed on a computing system separate from one or more other components of the system 100. A data repository 120 may be logically integrated with one or more other components of the system 100. Alternatively or additionally, a data repository 120 may be communicatively coupled to one or more other components of the system 100 via a direct connection or via a network. In FIG. 1, a data repository 120 is illustrated as storing various kinds of information. Some or all of this information may be implemented and/or distributed across any of the components of the system 100. However, this information is illustrated within the data repository 120 for purposes of clarity and explanation.

In an embodiment, a user interface 118 refers to hardware and/or software configured to facilitate communications between a user and the pathfinding service 110. A user interface 118 renders user interface elements and receives input via user interface elements. A user interface 118 may be a graphical user interface (GUI), a command line interface (CLI), a haptic interface, a voice command interface, and/or any other kind of interface or combination thereof. Examples of user interface elements include checkboxes, radio buttons, dropdown lists, list boxes, buttons, toggles, text fields, date and time selectors, command lines, sliders, pages, and forms.

In an embodiment, different components of a user interface 118 are specified in different languages. The behavior of user interface elements may be specified in a dynamic programming language, such as JavaScript. The content of user interface elements may be specified in a markup language, such as hypertext markup language (HTML), Extensible Markup Language (XML), or XML User Interface Language (XUL). The layout of user interface elements may be specified in a style sheet language, such as Cascading Style Sheets (CSS). Alternatively or additionally, aspects of a user interface 118 may be specified in one or more other languages, such as Java, Python, Perl, C, C++, and/or any other language or combination thereof.

In an embodiment, one or more components of the system 100 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

2. Operations for Multi-Factor Pathfinding

Figure 2:
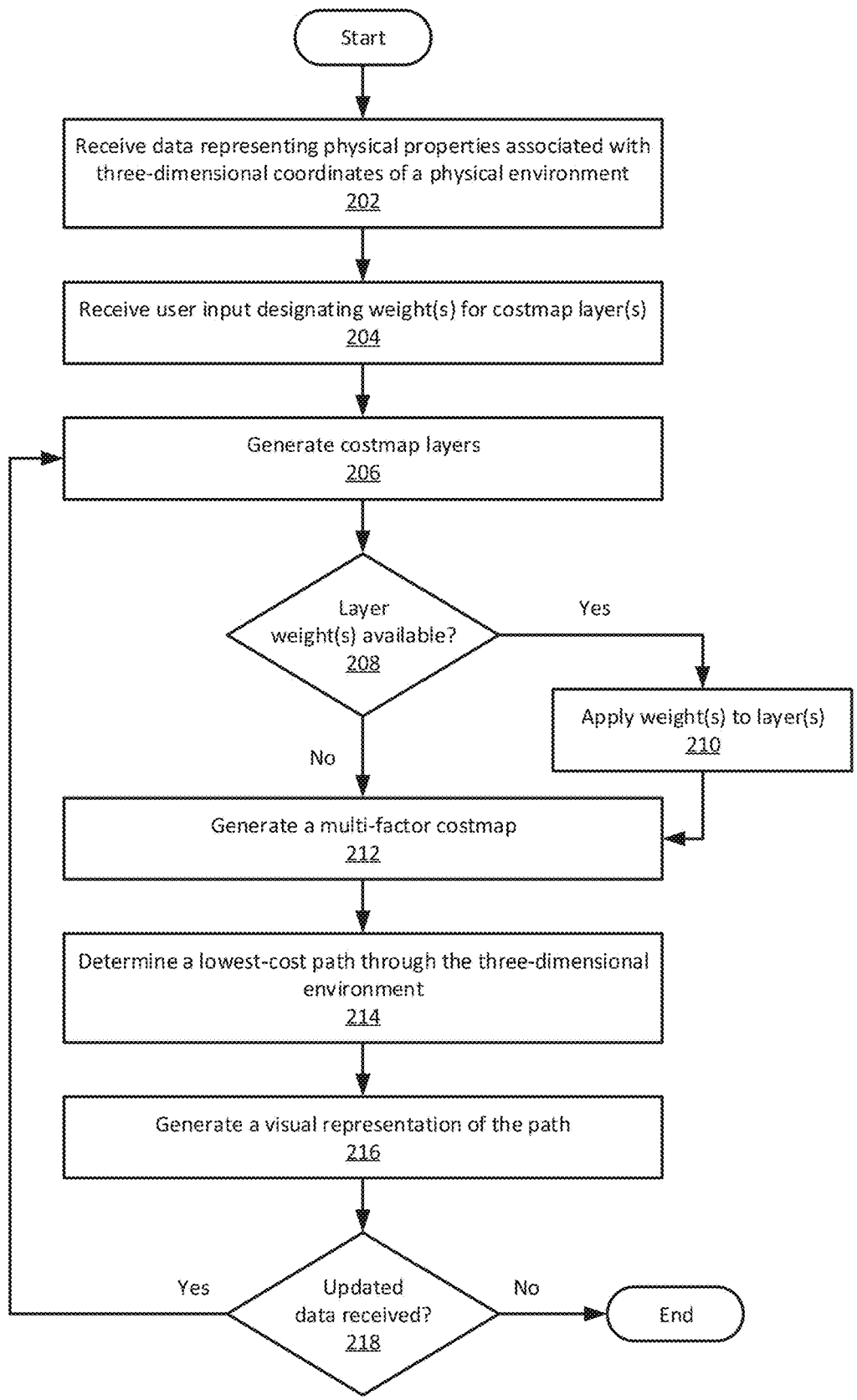
FIG. 2 is a flow diagram of an example of operations for multi-factor pathfinding according to an embodiment.

FIG. 2 is a flow diagram of an example of operations for multi-factor pathfinding according to an embodiment. One or more operations illustrated in FIG. 2 may be modified, rearranged, or omitted all together. Accordingly, the particular sequence of operations illustrated in FIG. 2 should not be construed as limiting the scope of one or more embodiments.

In an embodiment, a system (e.g., one or more components of the system 100 of FIG. 1) receives data representing physical properties associated with three-dimensional coordinates of a physical environment (Operation 202). Specifically, the system receives one or more data sets from one or more sensors in the physical environment (or from one or more other sources having access to such data), each data set representing one or more particular physical properties of the physical environment. One or more of the data sets may include a three-dimensional point cloud. In an embodiment, a sensor does not generate a three-dimensional point cloud, but supplies data that is used to generate a three-dimensional point cloud. For example, one or more system components may receive or generate a three-dimensional point cloud based on imagery from one or more satellites (SAT), unmanned aerial vehicles (UAV's, sometimes referred to as "drones"), light detection and ranging (LIDAR), and/or another source or combination thereof. Alternatively or additionally, one or more data sets may include human-generated data, based on human observations in the physical environment. In some embodiments, static data (as opposed to raw or live sensor data) that has been reported from a variety of sources may be used.

In addition, the system may receive user input corresponding to one or more criteria for determining a lowest-cost path in the physical environment. For example, the criteria may include a starting location, an end location, and/or one or more priorities (e.g., one or more physical properties to avoid or prefer when determining the lowest-cost path). In an embodiment, the system receives user input designating one or more weights for one more costmap layers (Operation 204). When applied to one or more costmap layers, as described below, a weight prioritizes or deprioritizes the physical property represented by that costmap layer. The user input may designate a weight directly, by specifying the exact weight to be applied to the costmap layer. Alternatively, the user input may designate a weight indirectly For example, indirectly designating a weight may include selecting from "high," "medium," or "low" priority options, providing an alphanumeric value that is not identical to the weight actually applied to the costmap layer, changing an ordering of a list of physical properties, or some other indirect designation. The system may translate an indirect designation (e.g., "high priority") to a direct designation (e.g., a specific numerical weight). In some embodiments, a user may change and/or reassign one or more weights for one or more of the costmap layers, if desired. The system may be configured to use the changed and/or reassigned weight(s), for example, in further operations as discussed herein.

In an embodiment, the system generates costmap layers (Operation 206). Specifically, the system generates the costmap layers based on the data sets that represent the physical properties associated with three-dimensional coordinates of the physical environment. A costmap layer may take different forms. In an embodiment, a costmap layer is a data structure that encodes numerical values for one or more of the three-dimensional coordinates, where each numerical value supplies information about the physical property at that coordinate. Some costmap layers may be partial layers, i.e., include data for only a subset of the three-dimensional coordinates under consideration. For example, a particular sensor may have a range that allows it to gather information for only a partial area of the physical environment. Other costmap layers may include data for all of the three-dimensional coordinates under consideration. Data included in a costmap layer may be the same as data received by the system (e.g., the same numerical values). Alternatively, the system may translate received data into a different format to use in a costmap layer. For example, the system may translate a received numerical or non-numerical format into a particular numerical format that the system uses in costmap layers. For example, the system may use a particular numerical format that standardizes numerical values in a particular range (e.g., 1-10 or 1-100).

In an embodiment, the system determines whether any weight(s) is/are available for any of the costmap layers (Operation 208). For each weight that is available, the system applies that weight to the corresponding layer (Operation 210). Applying a weight may involve multiplying values in the costmap layer by the weight, adding the weight to the values in the costmap layer, and/or performing another numerical transformation or combination thereof based on the designated weight for that layer.

In an embodiment, the system generates a multi-factor costmap (Operation 212). To generate the multi-factor costmap, the system may combine data from multiple costmap layers, such that a single cost value is associated with each three-dimensional coordinate in the physical environment. For example, for each three-dimensional coordinate, the system may add, multiply, or otherwise combine the values across the layers for that three-dimensional coordinate.

In an embodiment, the system determines a lowest-cost path through the three-dimensional environment (Operation 214). The lowest-cost path may be a best effort, based on the available data, which may be inaccurate and/or change over time. Specifically, the system determines the lowest-cost path based on the multi-factor costmap. For example, the system may use the A* search algorithm to determine the lowest-cost path. Alternatively, the system may use Floyd-Warshall, Johnson's algorithm, and/or another algorithm or combination thereof. The system may use multiple algorithms and determine the lowest-cost path based on the multiple results, for example by determining an average or highest-confidence path. The lowest-cost path may include three-dimensional coordinates or two-dimensional coordinates. In many cases, two-dimensional coordinates are sufficient to indicate direction of movement across physical terrain, with the understanding that altitude may vary along the way.

In an embodiment, the system generates a visual representation of the lowest-cost path (Operation 216). To generate the visual representation of the lowest-cost path, the system may obtain an existing two-dimensional or three-dimensional visual representation of the physical environment and mark the coordinates of the lowest-cost path (e.g., using one or more particular colors) on the existing visual representation. The system may be configured to present the map in a user interface. When presented in a user interface, the visual representation of the lowest-cost path allows for operational planning based on multiple factors (i.e., multiple physical properties) in the physical environment.

In an embodiment, the system is configured to adjust the lowest-cost path as conditions in the physical environment change over time and/or as new data becomes available. Specifically, the system may determine whether updated data has been received (Operation 218). The updated data may be a new data set (i.e., representing a physical property of the physical environment that was not previously taken into account) or a modified version of a data set that was previously used (i.e., a data set indicating a change in a physical property of the physical environment that was previously taken into account). In some embodiments, if the system has received updated data, then the system may repeat the process of determining the lowest-cost path. Based on the updated data, the lowest-cost path may change from one determination to the next. Thus, some embodiments support determining an updated path based on the availability of recent data (which may indicate, for example, a changing state of relevant equipment, ground, and/or other environmental factors). In some embodiments, the costmap (and in turn, the path), may be updated in real time based on the updated data. The displayed path may also be updated, to allow a user to see a visual rendering of the updated path as the costmap changes (for example, in real time). Alternatively, if conditions have not changed sufficiently (e.g., do not satisfy one or more threshold criteria) and/or have changed only with respect to low-priority physical properties, the lowest-cost path may remain the same.

Some prior pathfinding systems, such as those used in robots and autonomous vehicles (e.g., Robot Operating System (ROS)) have navigation stacks that depend on raw, live sensor data that is processed immediately to determine a path in real time. These real-time systems are intended for autonomous robot navigation and provide only limited support for static data. For example, ROS can work with static point clouds only in Point Cloud Library (PCL) format, which cannot represent many different kinds of data that are useful for pathfinding (e.g., RF propagation data as described herein). In general, prior pathfinding systems' limited support for static data does not allow for the granularity, breadth, and flexibility of information provided by labeled point clouds and multi-factor costmaps as described herein. For example, prior pathfinding systems are incapable of adjusting a lowest-cost path, from start to finish, as new information becomes available and/or as user-specified criteria (e.g., weights) change. In addition, the focus on raw, live data in prior pathfinding systems means that they are unable to accommodate new data from different data sources that were not previously considered (e.g., introducing an additional layer to a multi-layer costmap). In contrast, one or more embodiments described herein provide tools for pre-planning routes, e.g., for troops or first responders, by operating on static data that may be refactored, supplemented, and/or updated any number of times.

3. Additional Examples

Detailed examples are described below for purposes of clarity. Components and/or operations described below should be understood as examples that may not be applicable to one or more embodiments. Accordingly, components and/or operations described below should not be construed as limiting the scope of one or more embodiments.

Figure 3:
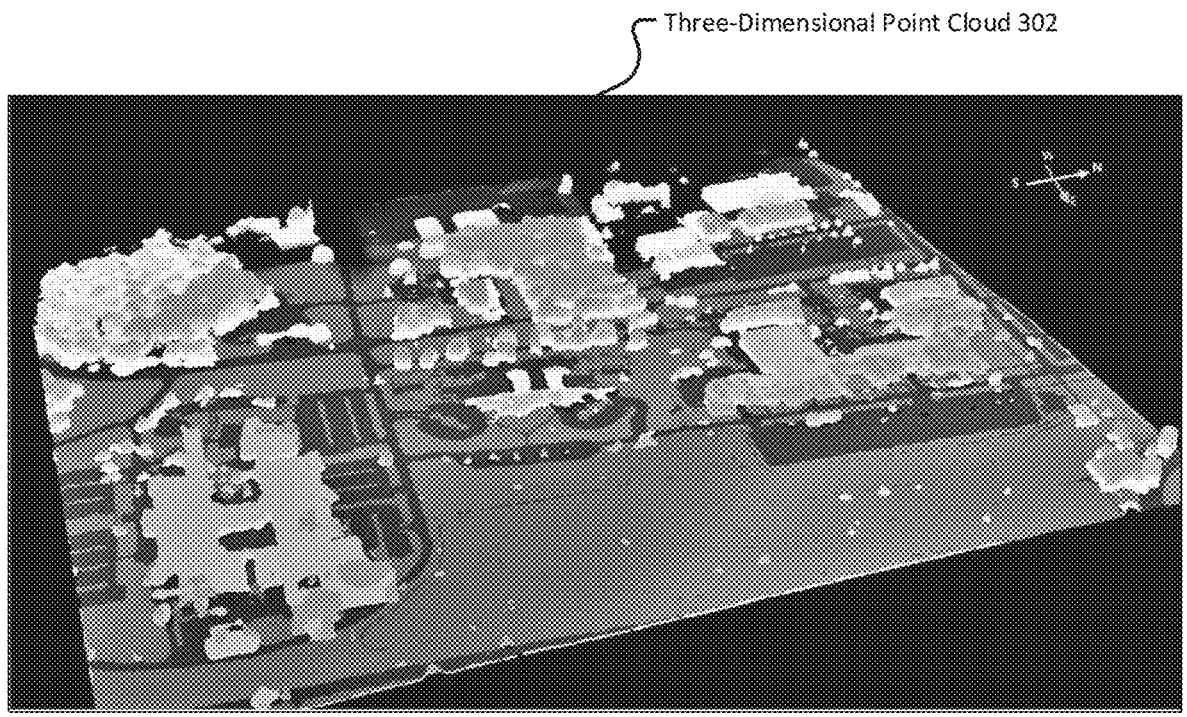
FIG. 3 illustrates an example of a point cloud according to an embodiment.

FIG. 3 illustrates an example of a three-dimensional point cloud 302 according to an embodiment. Specifically, FIG. 3 illustrates a visual representation of a three-dimensional point cloud 302 that may be used as an input data set for costmap and path generation. The visual representation may be based on underlying data (e.g., numerical values) that encode the three-dimensional point cloud 302. As illustrated in FIG. 3, the values of physical properties may vary from one three-dimensional coordinate to the next. For example, the materials of physical structures may vary between different three-dimensional coordinates. In this example, the different values of physical properties are visually represented as different grayscale values. Alternatively, different values of physical properties may be visually represented as different colors (not limited to grayscale), numerical values, labels, wireframe contours, and/or another representation or combination thereof.

Figure 4:
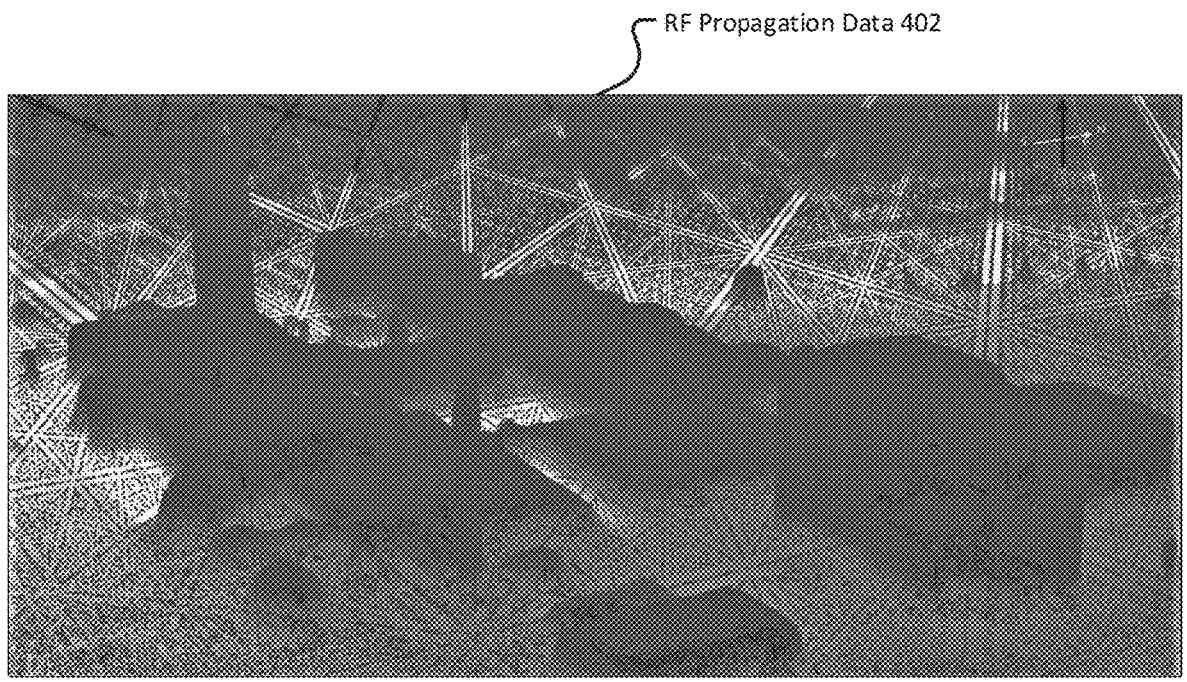
FIG. 4 illustrates an example of RF propagation data according to an embodiment.

FIG. 4 illustrates an example of RF propagation data 402 according to an embodiment. Specifically, FIG. 4 illustrates a visual representation of RF propagation data 402 that may be used as an input data set for costmap and path generation. The visual representation may be based on underlying data (e.g., numerical values) that encode the RF propagation data 402. As illustrated in FIG. 4, radio frequencies propagate through a physical environment along discernable paths. Those paths may truncate or decrease in magnitude upon encountering physical structures (e.g., buildings, particular those made of materials that block or inhibit radio frequencies) in the physical environment. Thus, RF propagation data 402 provides information that is helpful for determining a path that maintains contact with a transmitter, avoids a jammer, and/or otherwise accounts for RF propagation data 402, depending on the source(s) of RF propagation.

Figure 5:
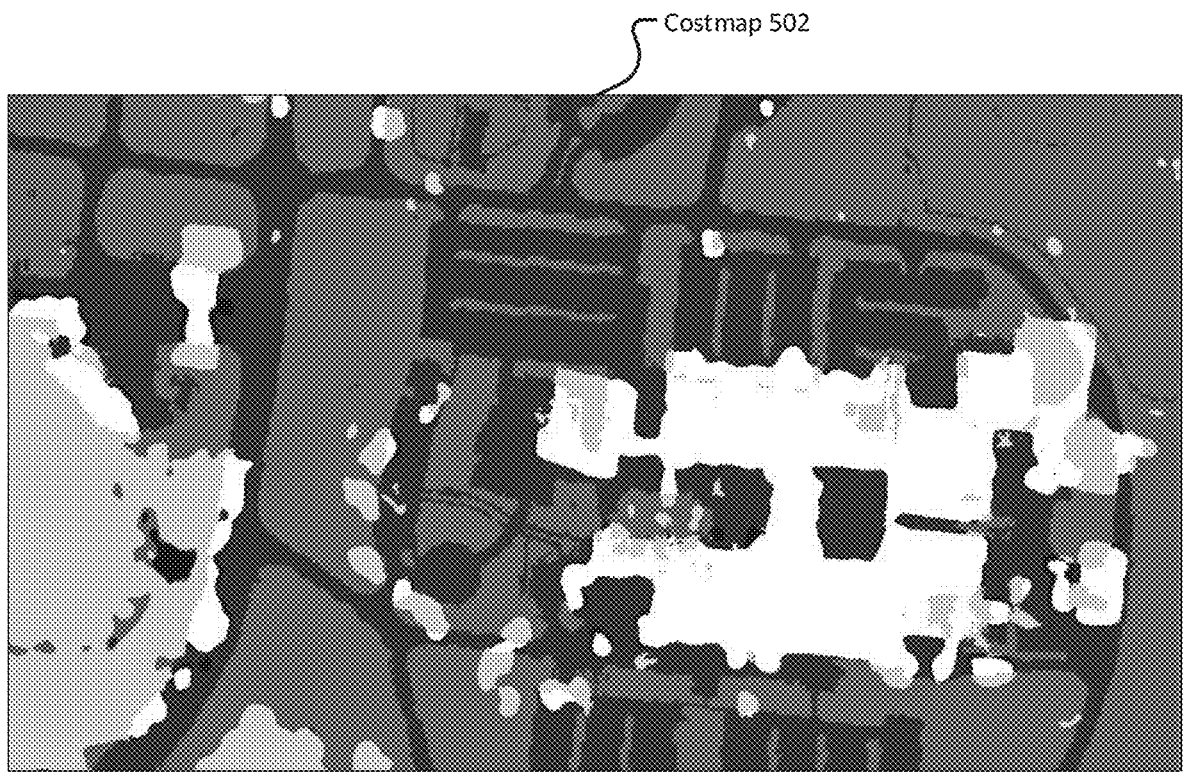
FIG. 5 illustrates an example of a costmap according to an embodiment.

FIG. 5 illustrates an example of a costmap 502 according to an embodiment. Specifically, FIG. 5 illustrates a visual representation of a costmap 502. The visual representation may be based on underlying data (e.g., numerical values) that encode the costmap 502. In this example, the costmap 502 represents a subset of the physical environment represented in the illustrations of FIGS. 3 and 4. In addition, in this example, different path costs are visually represented as different grayscale values. Alternatively, different path costs may be visually represented as different colors (not limited to grayscale), numerical values, labels, wireframe contours, and/or another representation or combination thereof.

FIG. 6 illustrates an example of path data 602 according to an embodiment. The path data 602 includes x-coordinates 604, y-coordinates 606, and a path cost 608. Specifically, the x-coordinates 604 and y-coordinates 606, taken together, indicate a path through a physical environment. The first numerical elements of the x-coordinates 604 and y-coordinates 606 (i.e., 10, 10) represent the two-dimensional coordinates of a starting location; the second numerical elements of the x-coordinates 604 and y-coordinates 606 (i.e., 11, 11) represent the two-dimensional coordinates of the next location along the path; and so on until reaching the destination (coordinates 170, 250). The path cost 608 is a numerical value based on a multi-layered costmap (not shown). For example, the path cost 608 may be a sum, product, or other combination of the costs associated with each coordinate along the path. While the path data 602 includes only x-coordinates 604 and y-coordinates 606, the cost of each coordinate may also be based on the anticipated z-coordinate (not shown) when traveling along the path.

Figure 7:
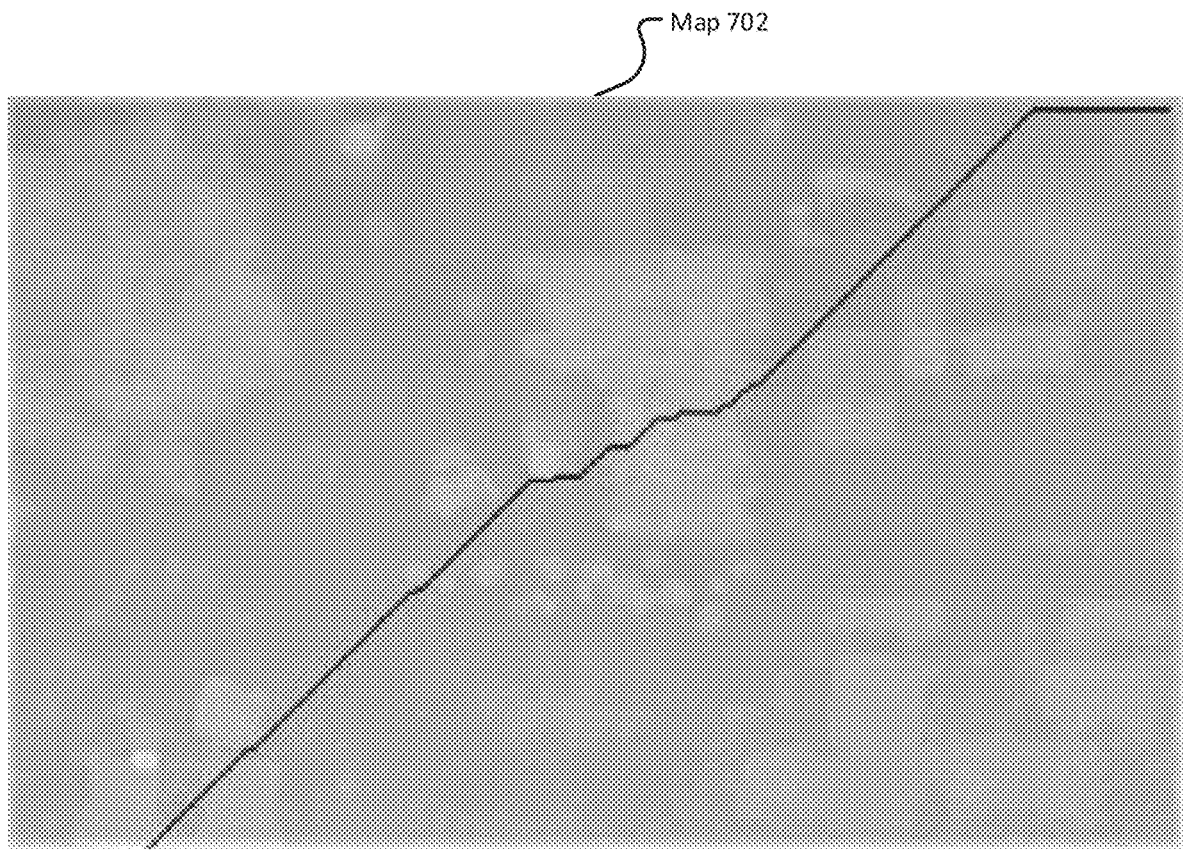
FIG. 7 illustrates an example of a map according to an embodiment.

FIG. 7 illustrates an example of a map 702 according to an embodiment. The example map 702 may be output to a display device, stored to a storage device, transmitted to another (e.g., remote) device for further processing, and/or otherwise output, stored, and/or transmitted. In this example, the lowest-cost path is overlaid as a dark line over a visual representation of the physical environment. In this example, the map provides a two-dimensional overhead view of the lowest-cost path through the physical environment. Alternatively, a map may provide a three-dimensional view of the lowest-cost path through the physical environment. A user interface may include controls to manipulate the map 702, such as zooming, panning, dialogue boxes with additional information (e.g., underlying data associated with specific coordinates), etc. Displaying a lowest-cost path on a map, e.g., based on one or more criteria as described above, may be useful to military personnel and/or non-military personnel, in many different contexts. For example, such a display may be useful for planning troop movement in a complex and/or contested environment. In non-military applications, such a display may be useful, for example, to first responders in a disaster situation.

Figure 8:
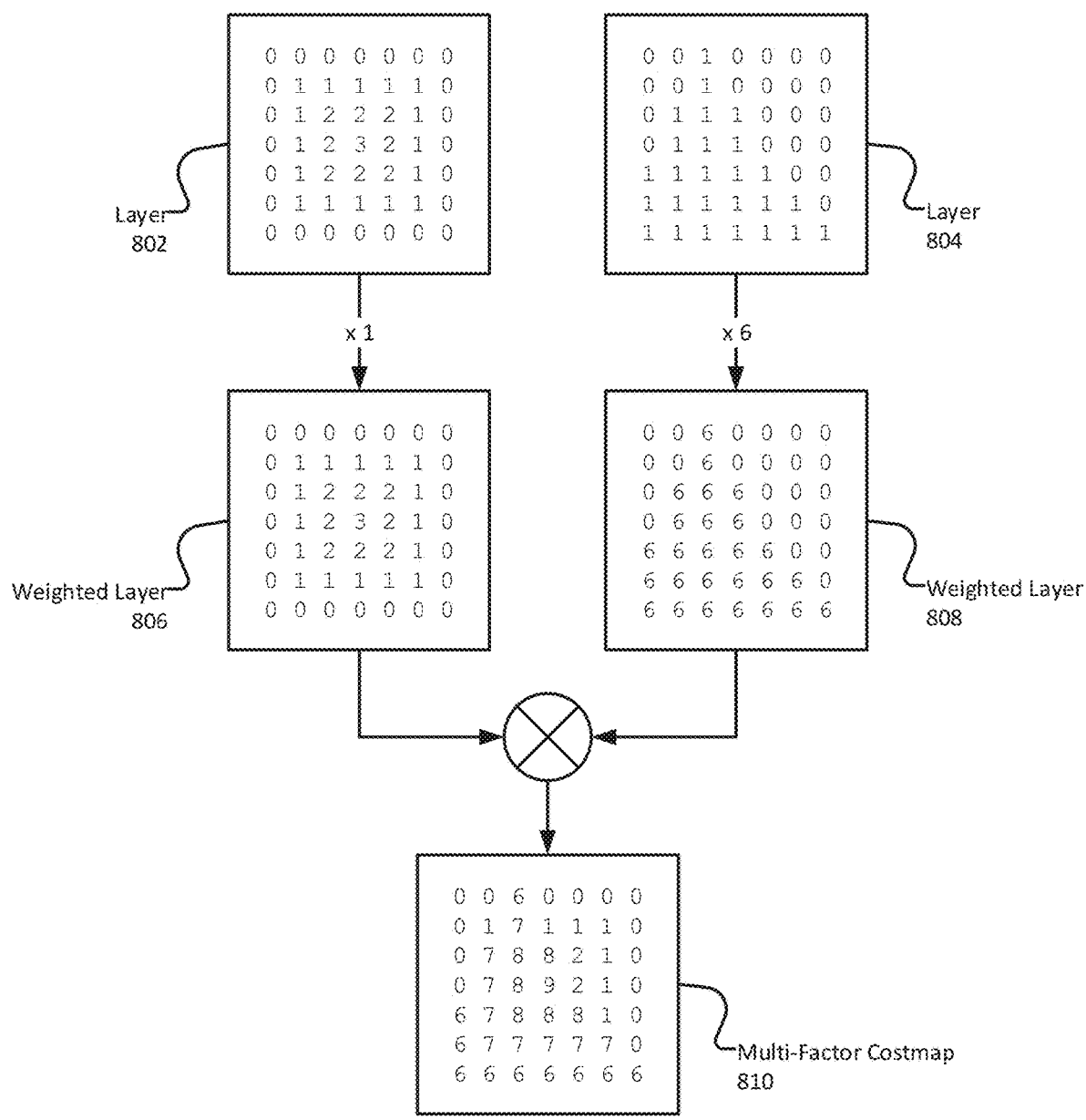
FIG. 8 illustrates an example of generating a multi-factor costmap according to an embodiment.

FIG. 8 illustrates an example of generating a multi-factor costmap 812 according to an embodiment. In this example, the multi-factor costmap 812 is based on two layers 802, 804. Each of the layers 802, 804 includes numerical values that represent physical properties in a physical environment. For ease of presentation, these examples are provided in two dimensions only. A similar example in three dimensions would have an additional dimension of numerical data for each of the layers 802, 804. Layer 802 does not have an assigned weight or is assigned a neutral weight of 1. When the system generates weighted layer 806, it is identical to layer 802. Layer 804 is assigned a weight of 6. When the system generates weighted layer 808, all of its values are 6 times the values in layer 804. In the illustrated example, to generate the multi-factor costmap, the system sums the values of the weighted layers 806, 808 at each coordinate. As discussed above, in other embodiments, other operations (e.g., other than summing) may be used to generate an effective multi-factor costmap. The multi-factor costmap 810 thus incorporates data from both layers 802, 804, while prioritizing the physical property represented by layer 804.

4. Miscellaneous

In an embodiment, a system includes one or more devices, including one or more hardware processors, that are configured to perform any of the operations described herein and/or recited in any of the claims.

In an embodiment, a non-transitory computer-readable storage medium stores instructions that, when executed by one or more hardware processors, cause performance of any of the operations described herein and/or recited in any of the claims.

Any combination of the features and functionalities described herein may be used in accordance with an embodiment. In the foregoing specification, embodiments have been described with reference to numerous specific details that may vary from implementation to implementation. Accordingly, the specification and figures are to be regarded in an illustrative rather than a restrictive sense. The sole and exclusive indicator of the scope of the invention, and what is intended by the Applicant to be the scope of the invention, is the literal and equivalent scope of the set of claims that issue from this application, in the specific form in which such claims issue, including any subsequent correction.

5. Computing Devices

In an embodiment, techniques described herein are implemented by one or more special-purpose computing devices (i.e., computing devices specially configured to perform certain functionality). The special-purpose computing device(s) may be hard-wired to perform the techniques and/or may include digital electronic devices such as one or more application-specific integrated circuits (ASICs), field programmable gate arrays (FPGAs), and/or network processing units (NPUs) that are persistently programmed to perform the techniques. Alternatively or additionally, a computing device may include one or more general-purpose hardware processors programmed to perform the techniques pursuant to program instructions in firmware, memory, and/or other storage. Alternatively or additionally, a special-purpose computing device may combine custom hard-wired logic, ASICs, FPGAs, or NPUs with custom programming to accomplish the techniques. A special-purpose computing device may include a desktop computer system, portable computer system, handheld device, networking device, and/or any other device(s) incorporating hard-wired and/or program logic to implement the techniques.

Figure 9:
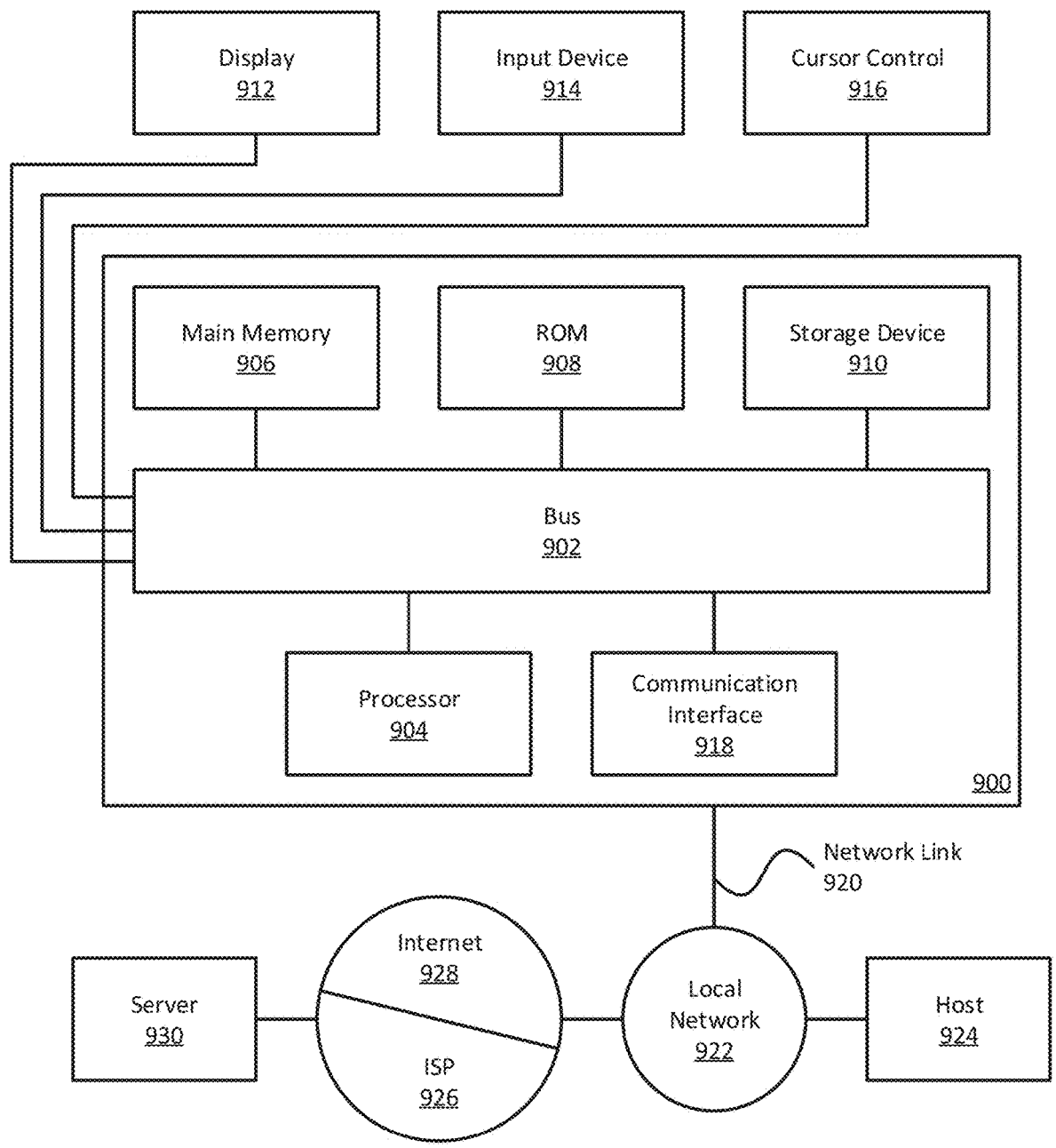
FIG. 9 is a block diagram of an example of a computer system according to an embodiment.

For example, FIG. 9 is a block diagram of an example of a computer system 900 according to an embodiment. Computer system 900 includes a bus 902 or other communication mechanism for communicating information, and a hardware processor 904 coupled with the bus 902 for processing information. Hardware processor 904 may be a general-purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in one or more non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a liquid crystal display (LCD), plasma display, electronic ink display, cathode ray tube (CRT) monitor, or any other kind of device for displaying information to a computer user. An input device 914, including alphanumeric and other keys, may be coupled to bus 902 for communicating information and command selections to processor 904. Alternatively or additionally, computer system 900 may receive user input via a cursor control 916, such as a mouse, a trackball, a trackpad, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane. Alternatively or additionally, computer system 9 may include a touchscreen. Display 912 may be configured to receive user input via one or more pressure-sensitive sensors, multi-touch sensors, and/or gesture sensors. Alternatively or additionally, computer system 900 may receive user input via a microphone, video camera, and/or some other kind of user input device (not shown).

Computer system 900 may implement the techniques described herein using customized hard-wired logic, one or more ASICs or FPGAs, firmware, and/or program logic which in combination with other components of computer system 900 causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. Alternatively or additionally, hard-wired circuitry may be used in place of or in combination with software instructions.

The term "storage media" as used herein refers to one or more non-transitory media storing data and/or instructions that cause a machine to operate in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape or other magnetic data storage medium, a CD-ROM or any other optical data storage medium, any physical medium with patterns of holes, a RAM, a programmable read-only memory (PROM), an erasable PROM (EPROM), a FLASH-EPROM, non-volatile random-access memory (NVRAM), any other memory chip or cartridge, content-addressable memory (CAM), and ternary content-addressable memory (TCAM).

A storage medium is distinct from but may be used in conjunction with a transmission medium. Transmission media participate in transferring information between storage media. Examples of transmission media include coaxial cables, copper wire, and fiber optics, including the wires that comprise bus 902. Transmission media may also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer may load the instructions into its dynamic memory and send the instructions over a network, via a network interface controller (NIC), such as an Ethernet controller or Wi-Fi controller. A NIC local to computer system 900 may receive the data from the network and place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922, and communication interface 918.

The received code may be executed by processor 904 as it is received, and/or stored in storage device 910, or other non-volatile storage for later execution.

6. Computer Networks

In an embodiment, a computer network provides connectivity among a set of nodes running software that utilizes techniques as described herein. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (for example, a request to execute a particular application and/or retrieve a particular set of data). A server process responds by executing the requested service and/or returning corresponding data.

A computer network may be a physical network, including physical nodes connected by physical links. A physical node is any digital device. A physical node may be a function-specific hardware device. Examples of function-specific hardware devices include a hardware switch, a hardware router, a hardware firewall, and a hardware NAT. Alternatively or additionally, a physical node may be any physical resource that provides compute power to perform a task, such as one that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (for example, a physical network). Each node in an overlay network corresponds to a respective node in the underlying network. Accordingly, each node in an overlay network is associated with both an overlay address (to address the overlay node) and an underlay address (to address the underlay node that implements the overlay node). An overlay node may be a digital device and/or a software process (for example, a virtual machine, an application instance, or a thread) A link that connects overlay nodes may be implemented as a tunnel through the underlying network. The overlay nodes at either end of the tunnel may treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources may be shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). In a hybrid cloud, a computer network includes a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, a system supports multiple tenants. A tenant is a corporation, organization, enterprise, business unit, employee, or other entity that accesses a shared computing resource (for example, a computing resource shared in a public cloud). One tenant (through operation, tenant-specific practices, employees, and/or identification to the external world) may be separate from another tenant. The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In an embodiment, in a multi-tenant computer network, tenant isolation is implemented to ensure that the applications and/or data of different tenants are not shared with each other. Various tenant isolation approaches may be used. In an embodiment, each tenant is associated with a tenant ID. Applications implemented by the computer network are tagged with tenant ID's. Additionally or alternatively, data structures and/or datasets, stored by the computer network, are tagged with tenant ID's. A tenant is permitted access to a particular application, data structure, and/or dataset only if the tenant and the particular application, data structure, and/or dataset are associated with a same tenant ID. As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants. A subscription list may indicate which tenants have authorization to access which applications. For each application, a list of tenant ID's of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels may be used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

What is claimed is:

1. One or more non-transitory machine-readable media storing instructions which, when executed by one or more processors, cause:
    receiving a plurality of data sets that represent a plurality of physical properties associated with a plurality of three-dimensional coordinates of a physical environment,
    generating a plurality of weighted data layers corresponding to the plurality of physical properties, at least by applying a plurality of weights to the plurality of data sets, respectively, wherein each weighted data layer in the plurality of weighted data layers comprises, respectively, a mapping of the plurality of three-dimensional coordinates to a plurality of weighted numerical representations of a physical property in the plurality of physical properties;
    generating a multi-factor costmap for the three-dimensional environment, based at least on the plurality of weighted data layers, wherein generating the multi-factor costmap comprises, for each three-dimensional coordinate in the plurality of three-dimensional coordinates, computing a sum of the corresponding weighted numerical representations across the plurality of weighted data layers;
    determining a path through the three-dimensional environment, based at least on the multi-factor costmap;
    displaying the path through the three-dimensional environment over a display device; and
    deploying an autonomous vehicle along the displayed path.

2. The one or more media of claim 1, further storing instructions which, when executed by one or more processors, cause:
    receiving user input that designates weights, in the plurality of weights, for at least two data sets in the plurality of data sets.

3. The one or more media of claim 1, further storing instructions which, when executed by one or more processors, cause:
    subsequent to determining the path through the three-dimensional environment, receiving an updated data set that represents a physical property in the plurality of physical properties;
    generating an updated multi-factor costmap, based at least on the updated data set; and
    determining an updated path through the three-dimensional environment, based at least on the updated multi-factor costmap.

4. The one or more media of claim 1,
    wherein each data set in the plurality of data sets comprises, respectively, a mapping of the plurality of three-dimensional coordinates to a plurality of numerical representations of a physical property in the plurality of physical properties, and
    wherein applying the plurality of weights to the plurality of data sets comprises, for each data set in the plurality of data sets, multiplying the plurality of numerical representations of the physical property by a corresponding weight in the plurality of weights.

5. The one or more media of claim 1, wherein the plurality of data sets comprises:
    a first data set indicating classifications of physical materials in the physical environment;
    a second data set indicating radio frequency propagation from a first source defined as a home base; and
    a third data set indicating radio frequency propagation from a second source defined as a jammer.

6. The one or more media of claim 5, wherein the plurality of data sets further comprises:
    a fourth data set indicating at least one location of at least one hostile force; and
    a fifth data set indicating at least one location of at least one friendly force.

7. A system comprising:
    at least one device including a hardware processor;
    the system being configured to perform operations comprising:
        receiving a plurality of data sets that represent a plurality of physical properties associated with a plurality of three-dimensional coordinates of a physical environment,
        generating a plurality of weighted data layers corresponding to the plurality of physical properties, at least by applying a plurality of weights to the plurality of data sets, respectively wherein each weighted data layer in the plurality of weighted data layers comprises, respectively, a mapping of the plurality of three-dimensional coordinates to a plurality of weighted numerical representations of a physical property in the plurality of physical properties;
        generating a multi-factor costmap for the three-dimensional environment, based at least on the plurality of weighted data layers, wherein generating the multi-factor costmap comprises, for each three-dimensional coordinate in the plurality of three-dimensional coordinates, computing a sum of the corresponding weighted numerical representations across the plurality of weighted data layers;
        determining a path through the three-dimensional environment, based at least on the multi-factor costmap;
        displaying the path through the three-dimensional environment over a display device; and
        deploying an autonomous vehicle along the displayed path.

8. The system of claim 7, the operations further comprising:
    receiving user input that designates weights, in the plurality of weights, for at least two data sets in the plurality of data sets.

9. The system of claim 7, the operations further comprising:
    subsequent to determining the path through the three-dimensional environment, receiving an updated data set that represents a physical property in the plurality of physical properties;
    generating an updated multi-factor costmap, based at least on the updated data set; and
    determining an updated path through the three-dimensional environment, based at least on the updated multi-factor costmap.

10. The system of claim 7,
    wherein each data set in the plurality of data sets comprises, respectively, a mapping of the plurality of three-dimensional coordinates to a plurality of numerical representations of a physical property in the plurality of physical properties, and
    wherein applying the plurality of weights to the plurality of data sets comprises, for each data set in the plurality of data sets, multiplying the plurality of numerical representations of the physical property by a corresponding weight in the plurality of weights.

11. The system of claim 7, wherein the plurality of data sets comprises:
    a first data set indicating classifications of physical materials in the physical environment;
    a second data set indicating radio frequency propagation from a first source defined as a home base; and
    a third data set indicating radio frequency propagation from a second source defined as a jammer.

12. The system of claim 11, wherein the plurality of data sets further comprises:
    a fourth data set indicating at least one location of at least one hostile force; and
    a fifth data set indicating at least one location of at least one friendly force.

13. A method comprising:
    receiving a plurality of data sets that represent a plurality of physical properties associated with a plurality of three-dimensional coordinates of a physical environment,
    generating a plurality of weighted data layers corresponding to the plurality of physical properties, at least by applying a plurality of weights to the plurality of data sets, respectively, wherein each weighted data layer in the plurality of weighted data layers comprises, respectively, a mapping of the plurality of three-dimensional coordinates to a plurality of weighted numerical representations of a physical property in the plurality of physical properties;
    generating a multi-factor costmap for the three-dimensional environment, based at least on the plurality of weighted data layers, wherein generating the multi-factor costmap comprises, for each three-dimensional coordinate in the plurality of three-dimensional coordinates, computing a sum of the corresponding weighted numerical representations across the plurality of weighted data layers;
    determining a path through the three-dimensional environment, based at least on the multi-factor costmap;
    displaying the path through the three-dimensional environment over a display device; and
    deploying an autonomous vehicle along the displayed path.

14. The method of claim 13, further comprising:
    receiving user input that designates weights, in the plurality of weights, for at least two data sets in the plurality of data sets.

15. The method of claim 13, further comprising:
    subsequent to determining the path through the three-dimensional environment, receiving an updated data set that represents a physical property in the plurality of physical properties;
    generating an updated multi-factor costmap, based at least on the updated data set; and
    determining an updated path through the three-dimensional environment, based at least on the updated multi-factor costmap.

16. The method of claim 13,
    wherein each data set in the plurality of data sets comprises, respectively, a mapping of the plurality of three-dimensional coordinates to a plurality of numerical representations of a physical property in the plurality of physical properties, and wherein applying the plurality of weights to the plurality of data sets comprises, for each data set in the plurality of data sets, multiplying the plurality of numerical representations of the physical property by a corresponding weight in the plurality of weights.

17. The method of claim 13, wherein the plurality of data sets comprises:
- a first data set indicating classifications of physical materials in the physical environment;
- a second data set indicating radio frequency propagation from a first source defined as a home base;
- a third data set indicating radio frequency propagation from a second source defined as a jammer;
- a fourth data set indicating at least one location of at least one hostile force; and
- a fifth data set indicating at least one location of at least one friendly force.

* * * * *